(12) United States Patent
Lai

(10) Patent No.: US 8,725,162 B2
(45) Date of Patent: May 13, 2014

(54) MOBILE COMMUNICATION DEVICE WITH POSITIONING CAPABILITY AND RELATED GPS RECEIVER

(75) Inventor: Ying-Lin Lai, Taipei (TW)

(73) Assignee: MStar Semiconductor, Inc., ChuPei, Hsin-Chu Hsien (TW)

(*) Notice: Subject to any disclaimer, the term of this patent is extended or adjusted under 35 U.S.C. 154(b) by 1302 days.

(21) Appl. No.: 11/773,433

(22) Filed: Jul. 5, 2007

(65) Prior Publication Data
US 2008/0125141 A1 May 29, 2008

Related U.S. Application Data

(60) Provisional application No. 60/806,619, filed on Jul. 5, 2006.

(51) Int. Cl.
*H04W 24/00* (2009.01)

(52) U.S. Cl.
USPC .......... 455/456.1; 455/456.2; 455/456.3; 455/456.4; 455/456.5; 455/456.6

(58) Field of Classification Search
USPC ................................. 455/456.1–6
See application file for complete search history.

(56) References Cited

U.S. PATENT DOCUMENTS 6,400,314 B1 * 6/2002 Krasner .................. 342/357.75
6,724,342 B2    4/2004 Bloebaum et al.

FOREIGN PATENT DOCUMENTS

WO         0209310 A2     1/2002

* cited by examiner

*Primary Examiner* — Kent Chang
*Assistant Examiner* — Chayce Bibbee
(74) *Attorney, Agent, or Firm* — Winston Hsu; Scott Margo

(57) ABSTRACT

A mobile communication device with positioning capability is provided, including: a global navigation satellite system (GNSS) receiver; a communication circuit for generating a control signal; an oscillator shared between the communication circuit and the GNSS receiver, for providing a clock signal having a frequency value corresponding to the control signal; and a decision unit, coupled to the communication circuit and the GNSS receiver, for recording the control signal; wherein the GNSS receiver obtains the frequency value of the clock signal according to the control signal recorded in the decision unit.

30 Claims, 7 Drawing Sheets

MOBILE COMMUNICATION DEVICE WITH POSITIONING CAPABILITY AND RELATED GPS RECEIVER

CROSS REFERENCE TO RELATED APPLICATIONS

This non-provisional application claims the benefit of U.S. provisional application No. 60/806,619, filed on Jul. 5, 2006 and incorporated herein by reference.

BACKGROUND OF THE INVENTION

1. Field of the Invention

The present invention relates to a technique of a mobile communication device, and more particularly, to a mobile communication device with a positioning capability.

2. Description of the Prior Art

Mobile communication devices (such as mobile phones) and global navigation satellite system (GNSS) receivers (such as GPS receivers) are both widely used electronic devices. For many, both of these devices are necessary in daily life. In order to satisfy the users' requirement, integrating GNSS receiver and mobile communication device functions together is becoming a trend. However, when integrating these functions together, many problems must be considered, such as power consumption, hardware cost, circuit board area, etc.

It is well known that both GNSS receivers and mobile communication devices need an oscillator to be a reference frequency source during operation. In prior art, the oscillator utilized by the GNSS receiver is usually an oscillator with high precision, such as a Temperature Compensated Crystal Oscillator (TCXO), which is calibrated to a specific frequency (such as 16.368 MHz). Most oscillators utilized in the mobile communication devices, however, are oscillators with lower precision, such as a Voltage-Controlled Temperature Compensated Crystal Oscillator (VCTCXO).

In order to reduce the hardware cost of integrating GNSS receiver and mobile communication functions together, a U.S. Pat. No. 6,724,342 provides a mobile communication device with a positioning capability, wherein the communication circuit and the positioning signal receiver share the same oscillator. However, the positioning signal receiver is quite sensitive to the precision and frequency drift of the reference frequency output by the oscillator. In the mobile communication device disclosed by the U.S. Pat. No. 6,724,342, if the communication circuit adjusts the output frequency of the shared oscillator while the positioning signal receiver extracts the satellite signals, the positioning signal receiver will not be immediately aware of the change in the oscillator's output frequency, thus resulting in occurrences of positioning errors (such as a positioning location suddenly diverging from a previous positioning location by a wide margin), or even not being able to detect the satellite signals.

One solution for the above problem is to control the shared oscillator to maintain a constant output frequency when the positioning signal receiver is extracting the satellite positioning signals. Unfortunately, this solution will result in a largely increased call drop rate for the mobile communication device, and thus will bring down the whole communication quality.

SUMMARY OF THE INVENTION

It is therefore one of the objectives of the present invention to provide a mobile communication device with a positioning capability so as to solve the above problem.

According to an embodiment of the present invention, a mobile communication device with positioning functionality is provided. The mobile communication device includes: a global navigation satellite system (GNSS) receiver; a communication circuit for generating a control signal; an oscillator shared between the communication circuit and the GNSS receiver, for providing a clock signal having a frequency value corresponding to the control signal; and a decision unit, coupled to the communication circuit and the GNSS receiver, for recording the control signal; wherein the GNSS receiver obtains the frequency value of the clock signal according to the control signal recorded in the decision unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
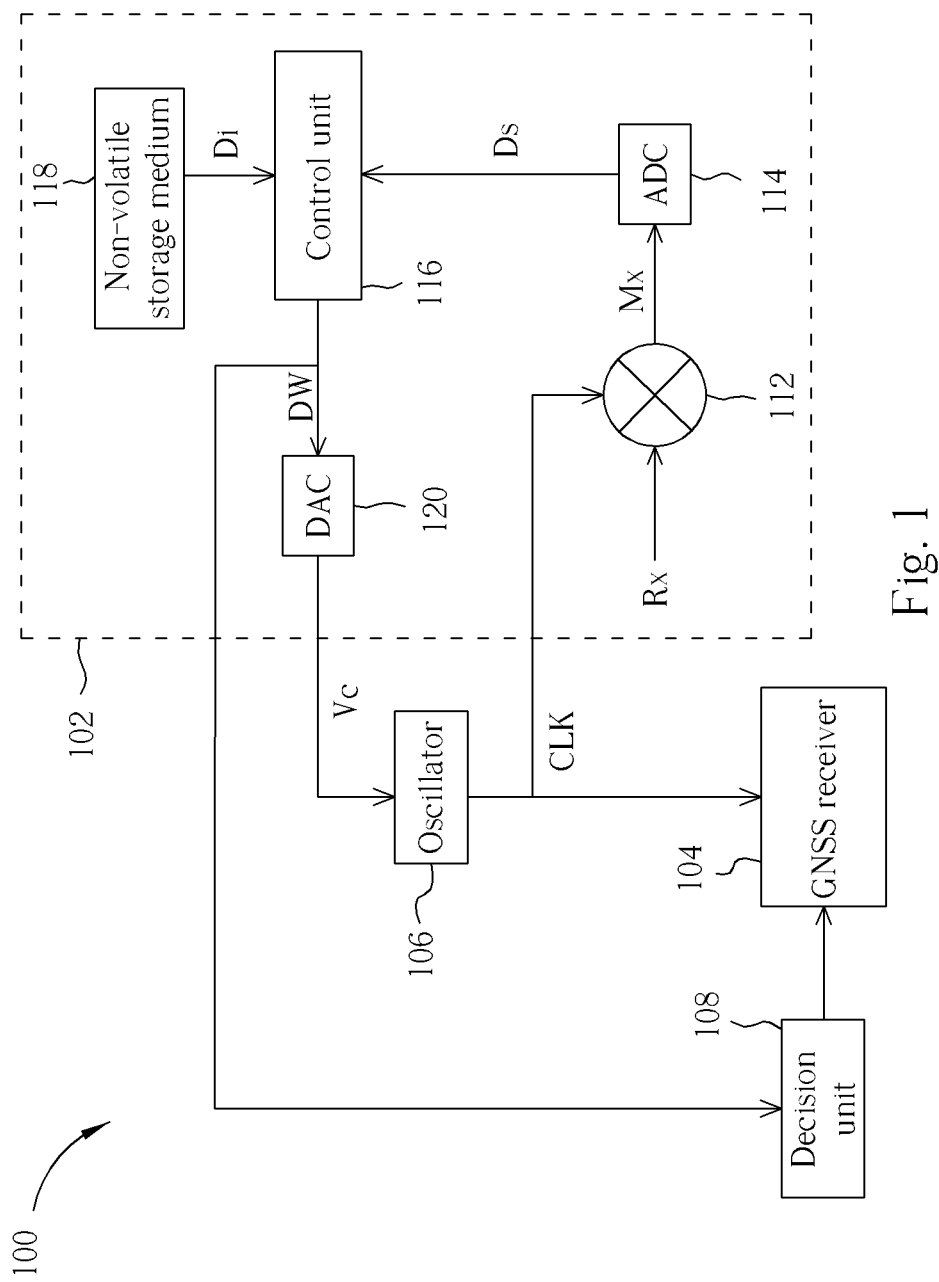
FIG. 1 shows a simplified diagram of a mobile communication device with positioning capability according to a first embodiment of the present invention.

Please refer to FIG. 1. FIG. 1 shows a simplified diagram of a mobile communication device 100 with positioning capability according to a first embodiment of the present invention. In a practical application, the applications of the mobile communication device 100 can include various portable user end equipment such as 2G/3G mobile phones or smart phones, etc. As shown in FIG. 1, the mobile communication device 100 includes a communication circuit 102, a global navigation satellite system (GNSS) receiver 104, an oscillator 106, and a decision unit 108, wherein the oscillator 106 is shared between the communication circuit 102 and the GNSS receiver 104.

The communication circuit 102 in mobile communication device 100 is utilized for communicating with the base station(s) in a mobile communication network so as to provide the audio or data transmission services required by the user. As shown in FIG. 1, the communication circuit 102 includes a mixer 112, an analog-to-digital converter (ADC) 114, a control unit 116, a non-volatile storage medium (such as FLASH or ROM) 118, and a digital-to-analog converter (DAC) 120, wherein an initial control value Di corresponding to a predetermined oscillating frequency of the oscillator 106 manufactured in a product line is stored in the non-volatile storage medium 118. For the sake of brevity, an antenna module and transmitting end circuit is not shown in FIG. 1.

The GNSS receiver 104 is utilized for receiving and analyzing satellite signals transmitted from a plurality of navigation satellites such as longitude, latitude, and altitude data, etc. so as to calculate a location position of the mobile communication device 100. For example, the above navigation satellites can be the GPS satellites of the United States of America, the Galileo satellites of the European Union, GLONASS satellites of the Russia, or any other satellites of the global navigation satellite system.

For convenience in the following illustration, it is presumed that the communication circuit 102 is a Wideband Code Division Multiple Access (W-CDMA) communication circuit complying with the 3GPP specification, and the GNSS receiver 104 is a GPS receiver. In other words, the mobile communication device 100 is a 3G mobile phone with the GPS positioning capability in this embodiment. Please note that this is only an exemplary embodiment, and does not limit the actual capabilities of the communication circuit 102 and the GNSS receiver 104.

The mobile communication device 100 with the GPS positioning capability has four different operation modes: an initial cell search mode, an out-of-service mode, an idle mode, and an active mode during communication. Unlike the CDMA2000 system, the base stations (also called the Node B) in the W-CDMA system need not be synchronized with each other. Thus, each base station in the W-CDMA system uses a unique Primary Scrambling Code (PSC) for identification, and a process of the user end-equipment searching for the base station and becoming synchronized with the PSC thereof is called the cell search. The cell search of the base station can be divided into five phases: slot synchronization, frame synchronization and scrambling code group identification, scrambling code identification, frequency acquisition, and cell identification. The mobile communication device 100 will perform the cell search operation in its initial cell search mode, idle mode, and active mode mentioned above.

In a comparison with an oscillator utilized in the base station, the oscillator 106 utilized in the mobile communication device 100 usually has a lower cost and relatively lower precision. In practice, the oscillator 106 can be realized by a voltage-controlled oscillator (VCO), such as a VCTCXO. Since the precision of the oscillator 106 is not as ideal as the oscillator utilized in the base station, the clock signal output from the oscillator 106 will have an offset. If such an offset is not calibrated, it will possibly result in reduced receiving efficiency of the communication circuit 102, and the communication between the mobile communication device 100 and the base stations will not be successful. Thus, during the above cell search process, the communication circuit 102 of the mobile communication device 100 will calibrate the oscillator 106 to synchronize the oscillator 106 output frequency with the oscillator utilized by the base station.

Figure 2:
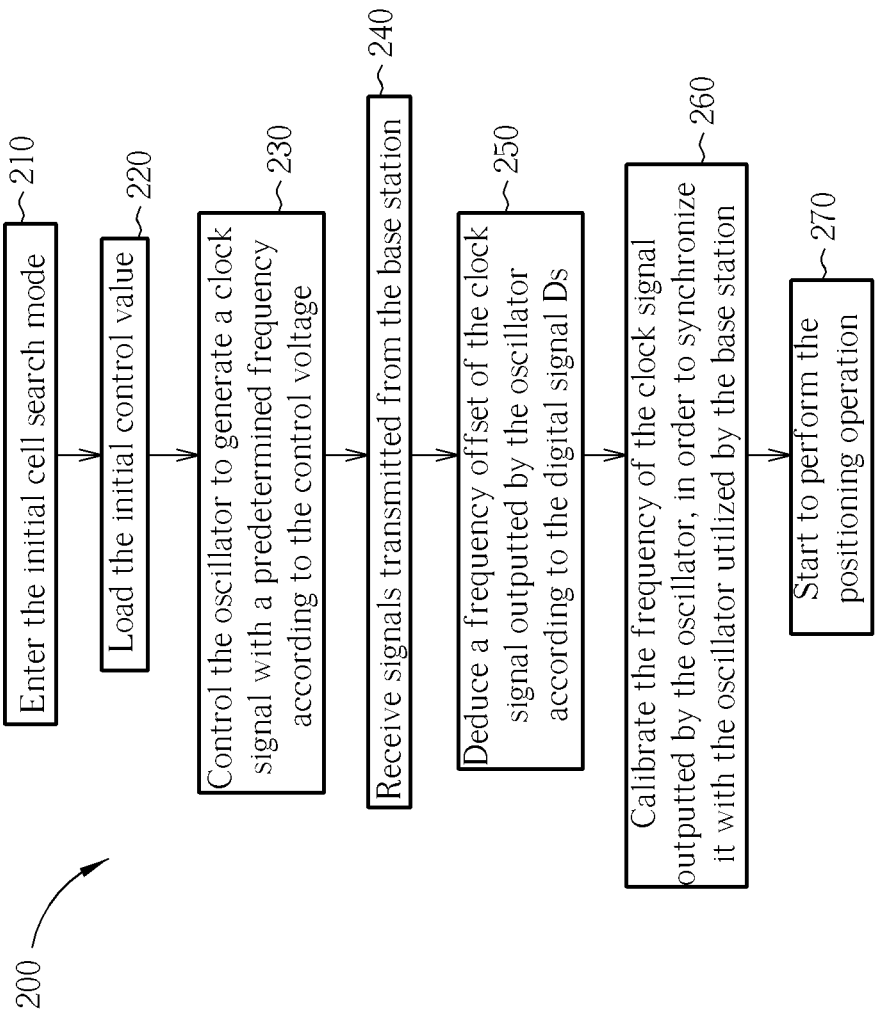
FIG. 2 shows a flowchart illustrating an operational embodiment of the mobile communication device in the initial cell search mode.

Please refer to FIG. 2. FIG. 2 shows a flowchart 200 illustrating an operational embodiment of the mobile communication device 100 in the initial cell search mode. When the mobile communication device 100 is turned on, the mobile communication device 100 will enter the initial cell search mode (step 210). At this time, the control unit 116 of the communication circuit 102 will load the initial control value Di from the non-volatile storage medium 118 (step 220), and set the initial control value Di as the digital control value DW for the DAC 120. The DAC 120 will generate a control voltage Vc according to the digital control value DW, to control the oscillator 106 to generate a clock signal CLK with a predetermined frequency according to the control voltage Vc (step 230). When the communication circuit 102 receives a signal Rx transmitted from the base station (step 240), the mixer will mix the signal Rx with the clock signal CLK from the oscillator 106 to generate a mixed signal Mx, and the ADC will convert the mixed signal Mx into a digital signal Ds.

Next, the control unit 116 will carry out step 250 to deduce a frequency offset of the clock signal CLK outputted by the oscillator 106 according to the digital signal Ds, and the control unit 116 will adjust the digital control value DW according to the frequency offset. In this way, the DAC 120 will adjust the control voltage Vc to calibrate the frequency of the clock signal CLK outputted by the oscillator 106, in order to synchronize it with the high-precision oscillator utilized by the base station (step 260). By utilizing the above calibration method, the present invention can improve the precision of the frequency output by the oscillator 106, to approach the high precision of the oscillator utilized by the base station, thus allowing the mobile communication device 100 to utilize the lower-cost oscillator 106 as a reference frequency source without decreasing the communication efficiency. In practice, the function of control unit 116 can be realized by utilizing a microprocessor or a digital signal processor (DSP) to execute a program with a proper scheme.

It should be noted that the clock signal CLK output from the oscillator 106 might have a greater frequency fluctuation during the above frequency calibration process. Thus, even when the mobile communication device 100 receives an indication (from the user or the communication network) requesting the GNSS receiver 104 to perform the position locating operation, the GNSS receiver 104 of this embodiment will still be in an off or disabled state, to avoid a positioning error or a failure to detect the satellite signals from exceedingly high frequency variation in the clock signal CLK outputted by the oscillator 106. Only after the communication circuit 102 calibrates the frequency of the clock signal CLK output by the oscillator 106 to synchronize it with the oscillator in the base station will the GNSS receiver 104 will start to perform the positioning operation (step 270).

In practice, after the above frequency calibration process is finished (i.e. the oscillator 106 is with the oscillator in the base station), there is still a chance for frequency shift to occur between oscillator 106 and the oscillator of the base station. The frequency shift condition is likely caused by factors such as temperature variation of the oscillator 106, circuit aging of the oscillator 106, or the Doppler effect induced when the mobile communication device 100 moves, etc. The communication circuit 102 can continuously tune the oscillator 106 to maintain its output frequency within the frequency error range required by the 3GPP specification, thus ensuring good communication quality.

Please note that the control unit 116 of the communication circuit 102 will transmit the digital control value DW of the DAC 120 to the decision unit 108 in the first embodiment of FIG. 1. The decision unit 108 can be realized by utilizing various storage units such as a memory or register. It is well known from the above illustration that the digital control value DW of the DAC 120 and the frequency value of the clock signal CLK output from the oscillator 106 correspond to each other. Thus, the GNSS receiver 104 can deduce the frequency value of the clock signal CLK outputted by the oscillator 106 according to the digital control value DW stored in the decision unit 108, and the frequency value of the clock signal CLK is utilized as a reference for the GNSS receiver 104 when it performs the positioning operation. For example, the GNSS receiver 104 can utilize a predetermined transition function or look into a lookup table to get the frequency value of the clock signal CLK output by the oscillator 106 according to the digital control value DW.

Figure 3:
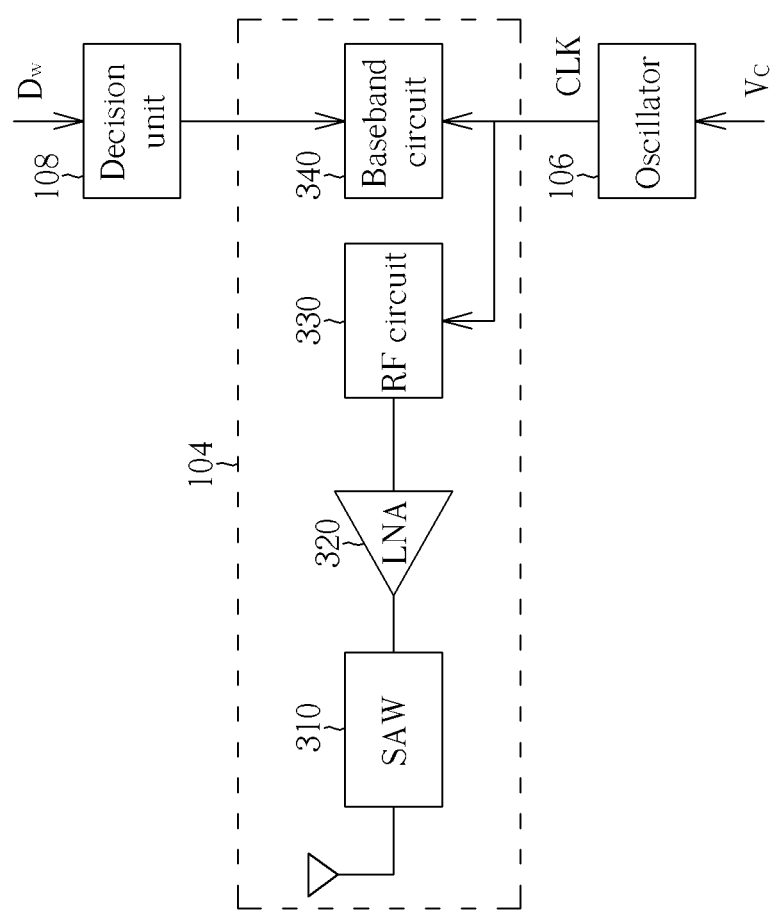
FIG. 3 shows a simplified diagram of the GNSS receiver according to an embodiment of the present invention.

FIG. 3 shows a simplified diagram of the GNSS receiver 104 according to an embodiment of the present invention. In this embodiment, the GNSS receiver 104 includes a surface audio wave (SAW) filter 310, a low noise amplifier (LNA) 320, a radio frequency (RF) circuit 330, and a baseband circuit 340. After the GNSS receiver 104 receives a GPS RF signal, the GPS RF signal will be processed via the SAW filter 310 and the LNA 320 and then will be input to the RF circuit 330. After the RF circuit 330 converts the GPS RF signal into a baseband signal, the baseband signal will be input to the baseband circuit 340. The RF circuit 330 and the baseband circuit 340 both need to refer to a clock signal when they process the signals. In this embodiment, the clock signal required by the RF circuit 330 and the baseband circuit 340 is provided by the oscillator 106 outside of the GNSS receiver 104, and since the baseband circuit 340 requires a higher frequency value of the clock signal CLK, the baseband circuit 340 can deduce the frequency value of the clock signal CLK outputted by the oscillator 106 according to the digital control value DW stored in the decision unit 108. This allows the frequency value of the clock signal CLK output by the oscillator 106 to be utilized as the reference for the GNSS receiver 104 when the GNSS receiver 104 performs the positioning operation.

Under this scheme, when the communication circuit 102 intends to adjust the frequency value of the clock signal CLK outputted by the oscillator 106, the GNSS receiver 104 can be made aware of the new frequency value of the clock signal CLK in advance, according to the digital control value DW received by the decision unit 108. In this manner, the GNSS receiver 104 will be aware of the upcoming clock signal CLK frequency variation, and does not need to utilize any other circuits to continuously detect the clock signal CLK. In this way, when the frequency value of the clock signal CLK changes, the GNSS receiver 104 can perform a compensation operation on the positioning operation according to the frequency variation of the clock signal CLK at the moment, in order to get a correct positioning result. When the GNSS receiver 104 performs the above compensation operation, the GNSS receiver 104 can refer to a frequency record throughout the history of the clock signal CLK, and the frequency record can be stored in the storage unit or the decision unit 108 inside the GNSS receiver 104. It is also practical to store all or the last plurality of digital control values output by the control unit 116 into the decision unit 108 so that the GNSS receiver 104 can retrieve the plurality of corresponding frequency values according to the plurality of digital control values.

In another embodiment, if the GNSS receiver 104 discovers that the upcoming frequency change in the clock signal CLK is too large (such as exceeding a predetermined variation value), then the GNSS receiver 104 will suspend the positioning operation. This course of action will prevent a wide discrepancy between the positioning point calculated before and after the frequency adjustment in the clock signal CLK.

Figure 4:
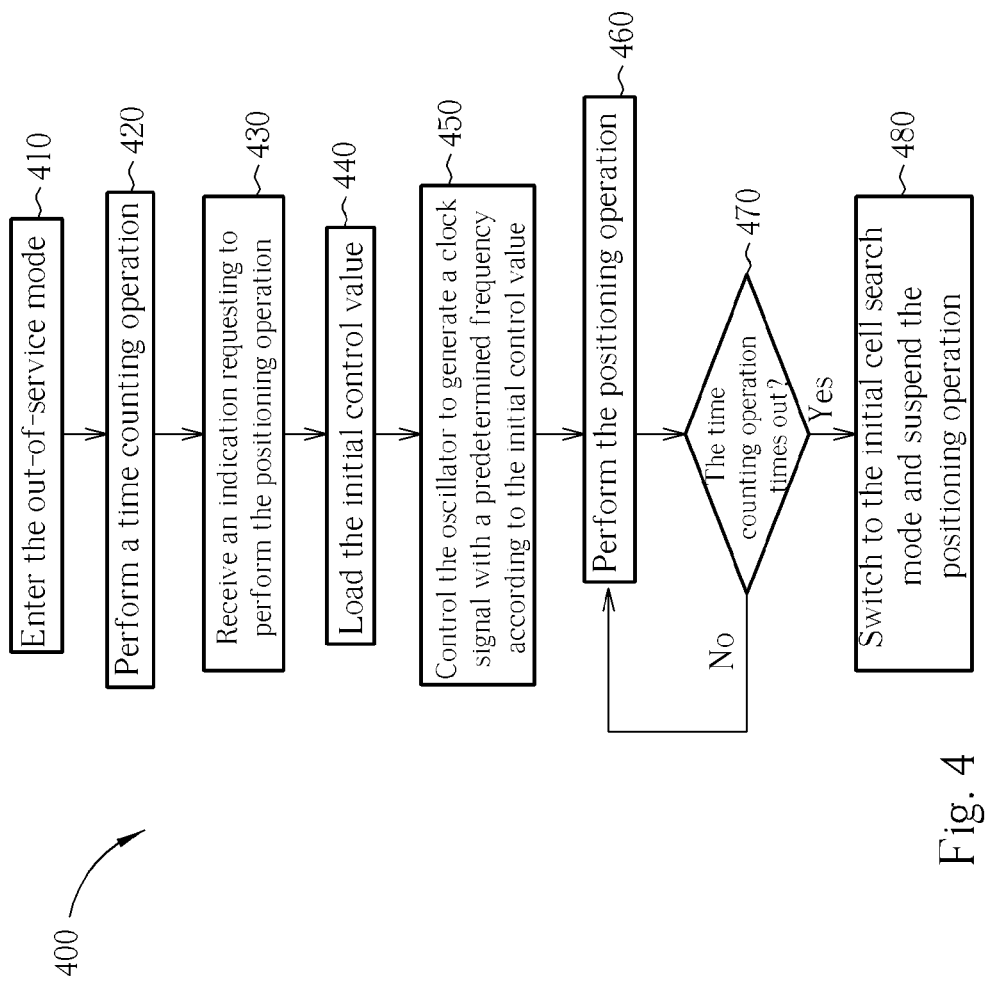
FIG. 4 shows a flowchart illustrating an operational embodiment of the mobile communication device in out-of-service mode.

Please refer to FIG. 4. FIG. 4 shows a flowchart 400 illustrating an operational embodiment of the mobile communication device 100 in out-of-service mode. If the mobile communication device 100 is out of a service range of the mobile communication network of the communication circuit 102 (for example, when the user brings the mobile communication device 100 to a remote rural district), or the communication circuit 102 is not able to find a base station after a predetermined time in the initial cell search mode, then the mobile communication device 100 will enter the out-of-service mode (step 410). The control unit 116 of the communication circuit 102 will perform a time counting operation when the mobile communication device 100 enters the out-of-service mode (step 420). If the mobile communication device 100 receives an indication requesting the GNSS receiver 104 to perform the positioning operation (step 430), then the control unit 116 will load the initial control value Di from the non-volatile storage medium 118 as a digital control value DW (step 440). The DAC 120 will generate a control voltage Vc according to the digital control value DW to control the oscillator 106 to generate a clock signal CLK with a predetermined frequency according to the control voltage Vc (step 450).

The GNSS receiver 104 will get the frequency value of the clock signal CLK output by the oscillator 106 according to the digital control value DW stored in the decision unit 108, and perform the positioning operation according to the frequency value of the clock signal CLK (step 460). As shown in the flowchart 400, before the time counting operation expires or times out (step 470), the GNSS receiver 104 will continuously perform the positioning operation to update the locating position of the mobile communication device 100. When the time counting operation times out (step 470), the mobile communication device 100 will switch to the initial cell search mode, and the positioning operation of the GNSS receiver 104 will be suspended (step 480), so as to prevent position calculation errors from occurring. In practice, the control unit 116 can send a timeout signal to notify the GNSS receiver 104 to suspend the positioning operation thereof when the timeout of the time counting operation happens.

If after switching to initial cell search mode the communication circuit 102 still cannot find any base stations within a predetermined time, then the mobile communication device 100 will enter the out-of-service mode again. Please note that the timeout length setting of the time counting operation in the step 420 can be varied with time. For example, the mobile communication device 100 can increase the timeout length setting of the time counting operation in Step 420 each time when the mobile communication device 100 switches from the initial cell search mode back to out-of-service mode. Doing so will reduce the switching frequency between the out-of-service mode and the initial cell search mode of the mobile communication device 100. The scheme of adjusting the timeout length setting of the time counting operation mentioned above is only an embodiment for the illustration, and it is a limit of the practical scheme of the present invention. In addition, since certain elements of the communication circuit 102 do not have to operate during most time of the out-of-service mode, it is practical to turn off those certain elements when they are not required to operate, reducing power consumption of the whole system.

Figure 5:
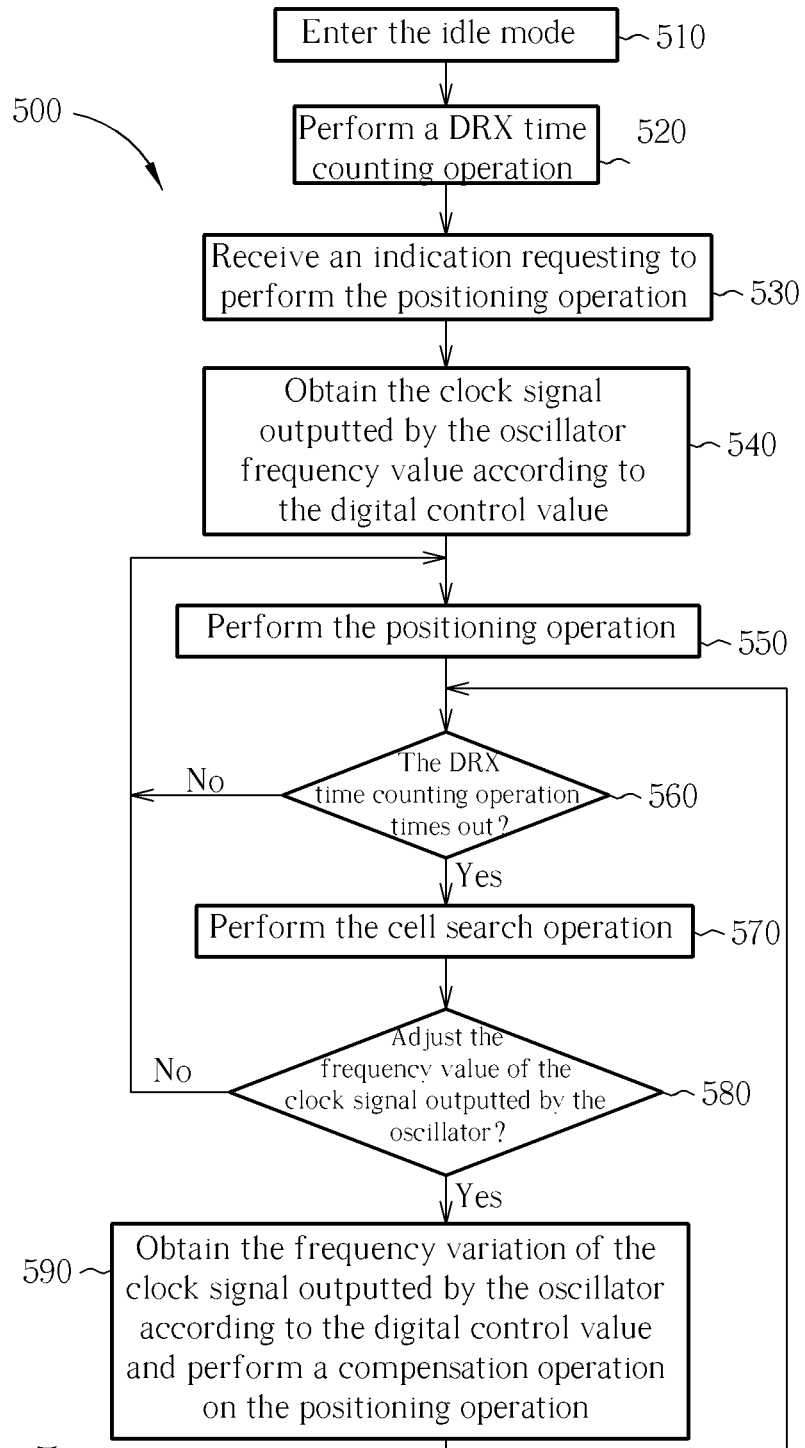
FIG. 5 shows a flowchart illustrating an operational embodiment of the mobile communication device in idle mode.

Please refer to FIG. 5. FIG. 5 shows a flowchart 500 illustrating an operational embodiment of the mobile communication device 100 in idle mode. After the mobile communication device 100 finishes the initial cell search operation, it can enter the idle mode (step 510) so communication circuit 102 can enter a discontinuous reception (DRX) scheme to save the electric power consumption. When the mobile communication device 100 enters idle mode, the control unit 116 will perform a DRX time counting operation (step 520), wherein the timeout length setting of the DRX time counting operation is usually assigned by the base station. In addition, the control unit 116 will maintain the digital control value DW of the DAC 120 at its last-used value during the previous cell search operation, so the clock signal CLK frequency can remain synchronized with the oscillator of the base station.

In idle mode, if the mobile communication device 100 receives an indication requesting the GNSS receiver 104 to perform the positioning operation (step 530), then the mobile communication device 100 will obtain the clock signal CLK outputted by the oscillator 106 frequency value according to the last digital control value DW received by the decision unit 108 during the last cell search operation (step 540), and will perform the positioning operation according to the obtained frequency value (step 550). As shown in the flowchart 500, before the DRX time counting operation times out (step 560), the GNSS receiver 104 will continuously perform the positioning operation to update the position of the mobile communication device 100.

When the DRX time counting operation times out (step 560), the mobile communication device 100 will turn on the communication circuit 102 to perform the cell search operation (step 570). At this time, the control unit 116 of the communication circuit 102 will control the frequency value of the clock signal CLK to allow synchronization between the communication circuit 102 and the base station. If the control unit 116 does not adjust the frequency value of the clock signal CLK (step 580), then GNSS receiver 104 will continue to perform the operation of step 550. If the control unit 116 adjusts the frequency value of the clock signal CLK outputted by the oscillator 106 (step 580), then the GNSS receiver 104 will be aware of the upcoming frequency variation of the clock signal CLK outputted by the oscillator 106 according to the digital control value DW received by the decision unit 108, and will perform a compensation operation on the positioning operation (step 590) to arrive at a correct positioning calculation result.

Figure 6:
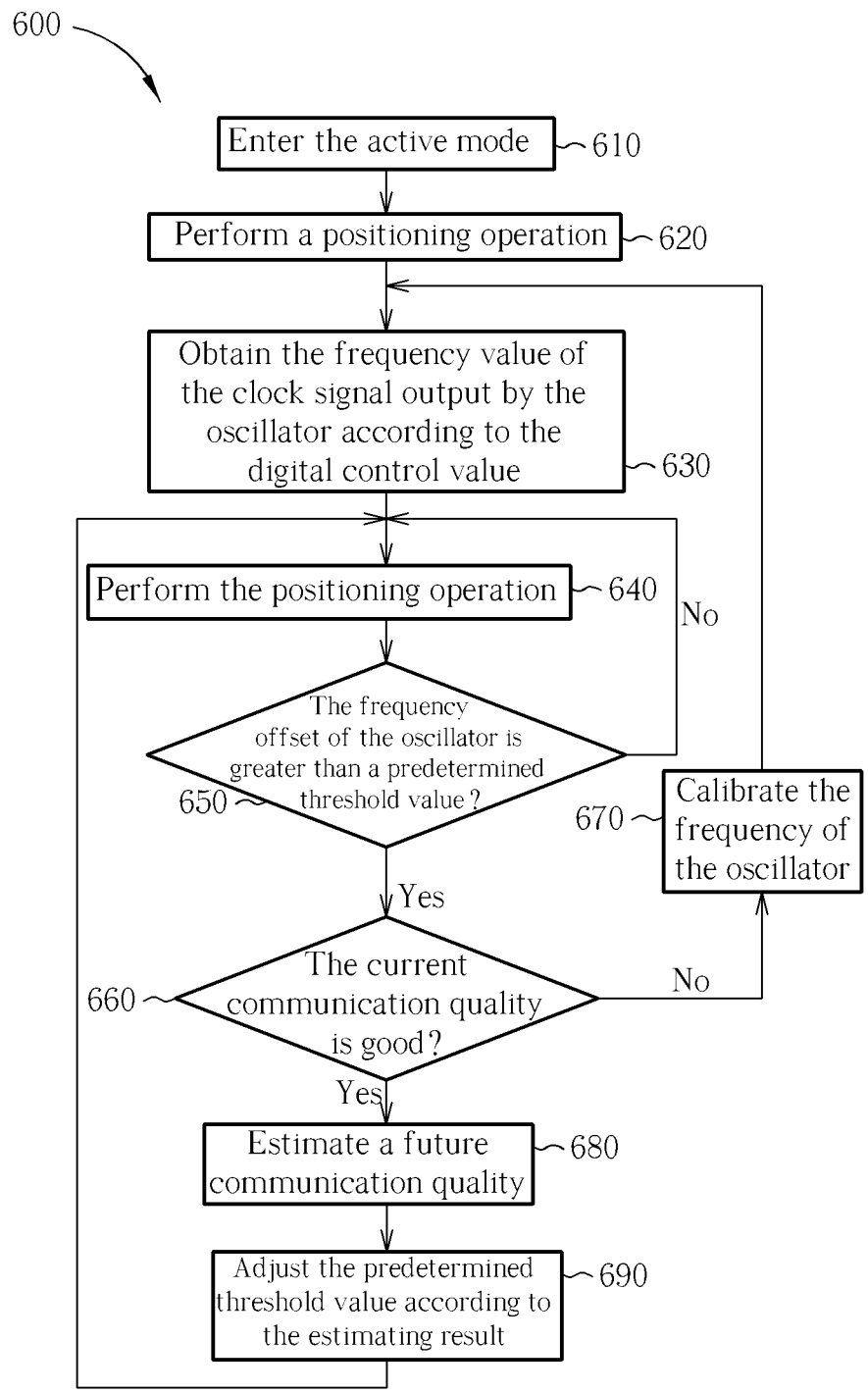
FIG. 6 shows a flowchart illustrating an operational embodiment of the mobile communication device in active mode.

Please refer to FIG. 6. FIG. 6 shows a flowchart 600 illustrating an operational embodiment of the mobile communication device 100 in active mode. When the mobile communication device 100 is communicating, the mobile communication device 100 can enter active mode (step 610). Before the mobile communication device 100 receives an indication requesting the GNSS receiver 104 to perform a positioning operation, the control unit 116 of the communication circuit 102 will continuously adjust and control the frequency value of the clock signal CLK output by the oscillator 106, maintaining synchronization with the base station. When the mobile communication device 100 receives the indication requesting the GNSS receiver 104 to perform a positioning operation (step 620), the GNSS receiver 104 will obtain the frequency value of the clock signal CLK output by the oscillator 106 according to the last digital control value DW received by the decision unit 108 (step 630), and the mobile communication device 100 will perform the positioning operation according to the obtained frequency value (step 640).

In active mode, if the frequency offset of the oscillator 106 deduced by the control unit 116 is not greater than a predetermined threshold value TH1 (step 650), then the control unit 116 will not adjust the digital control value DW (i.e. the frequency of the oscillator 106 will not be adjusted) to avoid frequently calibrating the output frequency of the oscillator 106. At this time, the GNSS receiver 104 will continue to perform the operation in step 640.

If the control unit 116 determines the frequency offset of the oscillator 106 to be greater than the predetermined threshold value TH1 in the step 650, then the control unit 116 will decide whether to adjust the frequency of the oscillator 106 or not, according to the communication quality of the communication circuit 102. For example, the control unit 116 can judge a current communication quality of the communication circuit 102 according to a bit error rate (BER) of the digital signal Ds (step 660). In an embodiment, if the BER of the digital signal Ds is higher than a predetermined value TH_BER, then the control unit 116 will determine that the current communication quality of the communication circuit 102 does not achieve a predetermined level (i.e. the current communication quality is not good); otherwise, the control unit 116 will determine that the current communication quality of the communication circuit 102 achieves the predetermined level (i.e. the current communication quality is good). Please note that the scheme of determining the current communication quality of the communication circuit 102 mentioned above is only an embodiment for illustrative purposes, and it should not be used to limit the practical scheme of the present invention.

If the control unit 116 determines that the current communication quality of the communication circuit 102 does not achieve the predetermined quality level, then the control unit 116 will adjust the digital control value DW to calibrate the output frequency of the oscillator 106 (step 670), in order to improve the communication quality. At this time, the GNSS receiver 104 will obtain a new frequency value of the oscillator 106 according to the digital control value DW received by the decision unit 108 (step 630), and the mobile communication device 100 will perform the positioning operation according to the newly obtained frequency value (step 640).

If the control unit 116 determines that the current communication quality of the communication circuit 102 already achieve the predetermined level, then the control unit 116 will not adjust the digital control value DW; that is, the control unit 116 will not change the frequency value of the clock signal CLK output by the oscillator 106. However, the control unit 116 will estimate a future communication quality of the communication circuit 102 (step 680), and the control unit 116 will adjust the predetermined threshold value TH1 used in step 650 according to the estimating result (step 690). In practice, the control unit 116 can estimate a future communication quality of the communication circuit 102 according to a current power control command of the communication circuit 102. For example, if a current inner loop power control command of the communication circuit 102 is a power-down command, then the control unit 116 can estimate that the future communication quality of the communication circuit 102 is good, and thus increase the predetermined threshold value TH1 used in step 650. On the other hand, if the current inner loop power control command of the communication circuit 102 is a power-up command, then the control unit 116 can estimate that the future communication quality of the communication circuit 102 is not good, and thus decrease the predetermined threshold value TH1 used in step 650. Please note that the scheme of estimating the future communication quality of the communication circuit 102 mentioned above is only an embodiment for illustration, and is not to limit the practical scheme of the present invention.

It is well known from the above description that the control unit 116 will determine whether to adjust the frequency of the oscillator 106 or not according to the communication quality of the communication circuit 102, and the control unit 116 will adjust the predetermined threshold value TH1 used in the step 650 adaptively while GNSS receiver 104 performs its positioning operation.

In the embodiment mentioned above, since the digital control value DW output by the control unit 116 and the frequency value of the clock signal CLK output by the oscillator 106 correspond to each other, the GNSS receiver 104 can obtain the frequency value of the clock signal CLK output by the oscillator 106 and the frequency variation thereof according to the digital control value DW. In practice, since the control voltage Vc output by the DAC 120 and the frequency value of the clock signal CLK output by the oscillator 106 also correspond to each other, thus the GNSS receiver 104 also can obtain the frequency value of the clock signal CLK output by the oscillator 106 and the frequency variation thereof according to the control voltage Vc.

Figure 7:
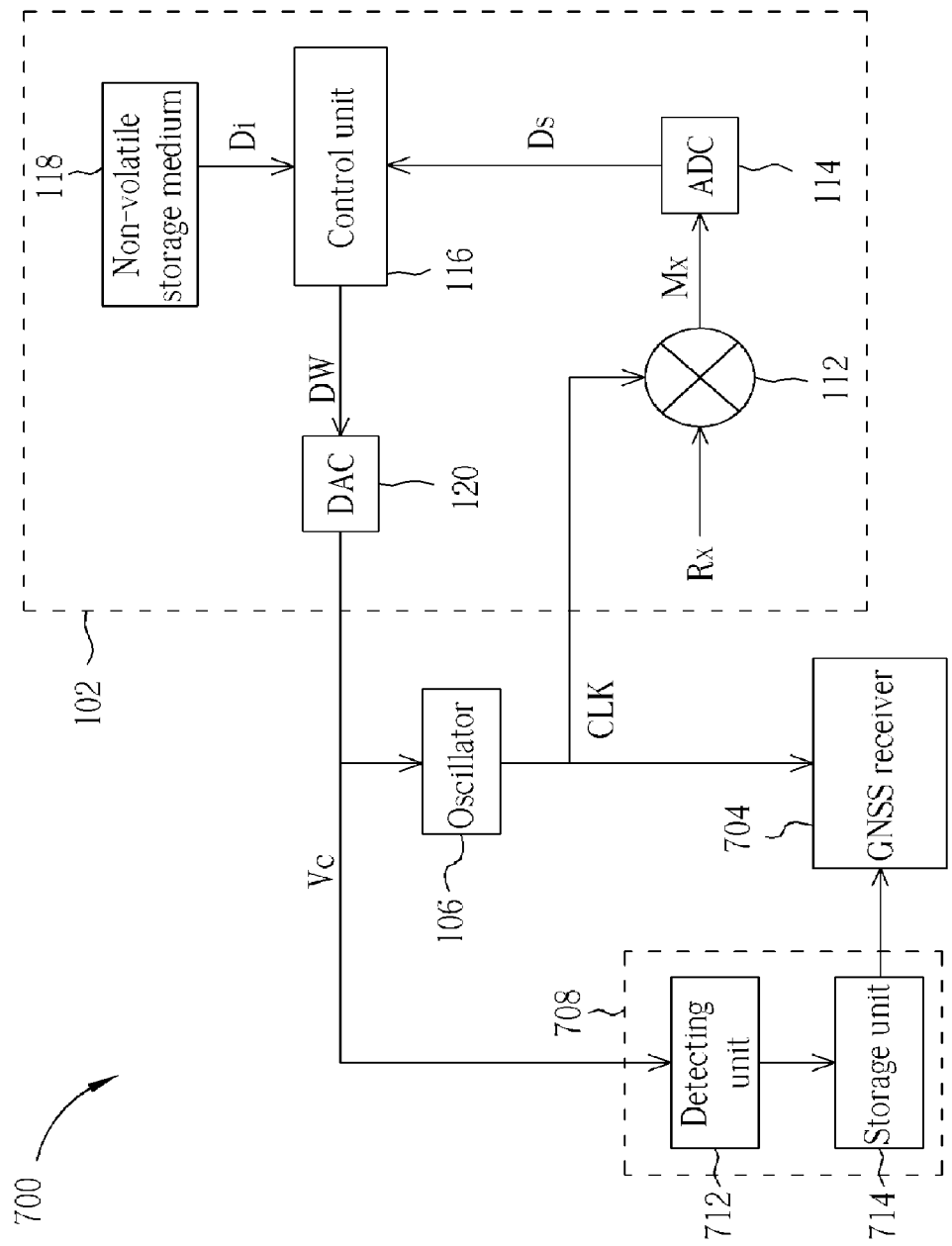
FIG. 7 shows a simplified diagram of a mobile communication device with positioning capability according to a second embodiment of the present invention.

Please refer to FIG. 7. FIG. 7 shows a simplified diagram of a mobile communication device 700 with positioning capability according to a second embodiment of the present invention. The mobile communication device 700 is very similar with the mobile communication device 100 shown in FIG. 1, and thus the elements that are substantially the same in operation in the two mobile communication devices are labeled with the same number for convenience. As in mobile communication device 100, the oscillator 106 in the mobile communication device 700 is also shared between the communication circuit 102 and the GNSS receiver 704.

One of the differences between mobile communication devices 100 and 700 is that the practical scheme of the decision unit 708 in mobile communication device 700 differs from the decision unit 108 mentioned above. As shown in FIG. 7, the decision unit 708 of the second embodiment includes a detecting unit 712 and a storage unit 714. The detecting unit 712 is utilized for detecting the voltage value of the control voltage Vc output by the DAC 120, and the storage unit 714 is utilized for storing the detecting result of the detecting unit 712 (that is, the voltage value of the control voltage Vc).

Another difference between the mobile communication devices 100 and 700 is that the GNSS receiver 704 in the mobile communication device 700 deduces the frequency value of the clock signal CLK output by the oscillator 106 according to the voltage value of the control voltage Vc stored in the storage unit 714, allowing the frequency value of the clock signal CLK to be the reference for the GNSS receiver 704 when the GNSS receiver 704 performs the positioning operation. For example, the GNSS receiver 704 can utilize a predetermined transition function or a lookup table to retrieve the frequency value of the clock signal CLK output by the oscillator 106 according to the voltage value of the control voltage Vc.

In the scheme of the mobile communication device 700, when the control unit 116 of the communication circuit 102 intends to adjust the frequency value of the clock signal CLK, the GNSS receiver 704 can be made aware of the new frequency value of the clock signal CLK in advance, according to the control voltage Vc received by the decision unit 708. In this manner, the GNSS receiver 704 will be aware of the upcoming clock signal CLK frequency variation, and does not need to utilize any other circuits to continuously detect the clock signal CLK. In this way, when the frequency value of the clock signal CLK changes, the GNSS receiver 704 can perform a compensation operation on the positioning operation according to the frequency variation of the clock signal CLK at the moment, in order to get a correct positioning calculation result. When the GNSS receiver 704 performs the above compensation operation, the GNSS receiver 704 can refer to a frequency record throughout the history of the clock signal CLK, and the frequency record can be stored in the storage unit or the storage unit 714 of the decision unit 708 inside the GNSS receiver 704. It is also practical to store all or the last plurality of control voltages Vc output by the DAC 120 into the storage unit 714 so that the GNSS receiver 704 can retrieve the plurality of corresponding frequency values according to the plurality of voltage values. In practice, both the digital control value DW generated by the control unit 116 and the control voltage Vc generated by the DAC 120 can be viewed as control signals output by the communication circuit 102. In other words, both of the GNSS receiver 104 and the GNSS receiver 704 in the embodiments mentioned above obtain the frequency value of the clock signal CLK output by the oscillator 106 and are aware of the frequency variation of the oscillator 106 in advance according to the control signals output by the communication circuit 102.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile communication device with positioning capability, comprising:
   a global navigation satellite system (GNSS) receiver;
   a communication circuit, for generating a control signal;
   an oscillator, shared between the communication circuit and the GNSS receiver, controlled by the control signal of the communication circuit to provide a clock signal having a frequency value corresponding to the control signal to the GNSS receiver and the communication circuit; and
   a decision unit, coupled to the communication circuit and the GNSS receiver, having at least a storage unit configured for recording digital information represented by the control signal, wherein the digital information is a control voltage of the oscillator, and the decision unit detects and records a voltage value of the control voltage;
   wherein the GNSS receiver obtains the frequency value of the clock signal according to the voltage value recorded in the decision unit.

2. The mobile communication device of claim 1, wherein the communication circuit comprises a digital-to-analog converter (DAC) for generating a control voltage according to the control signal, and the oscillator generates the clock signal according to the control voltage.

3. The mobile communication device of claim 1, wherein the oscillator is a voltage-controlled oscillator (VCO).

4. The mobile communication device of claim 1, wherein the oscillator is a voltage-controlled temperature compensated crystal oscillator (VCTCXO).

5. The mobile communication device of claim 1, wherein the communication circuit utilizes the control signal to calibrate the frequency value of the clock signal generated from the oscillator.

6. The mobile communication device of claim 1, wherein the communication circuit is a Wideband Code Division Multiple Access (W-CDMA) communication circuit complying with a 3GPP specification.

7. The mobile communication device of claim 1, wherein the GNSS receiver is a GPS receiver, a Galileo receiver, or a GLONASS receiver.

8. The mobile communication device of claim 1, wherein the decision unit records a plurality of digital information represented by a plurality of control signals output by the communication circuit at different times.

9. The mobile communication device of claim 8, wherein the GNSS receiver compensates a positioning operation according to the plurality of control signals recorded in the decision unit.

10. The mobile communication device of claim 8, wherein the GNSS receiver obtains an impending frequency variation of the clock signal according to the plurality of control signals recorded in the decision unit.

11. The mobile communication device of claim 10, wherein the GNSS receiver suspends the positioning operation when the impending frequency variation of the clock signal exceeds a predetermined variation value.

12. The mobile communication device of claim 1, wherein the GNSS receiver starts a positioning operation after the communication circuit is synchronized with a base station.

13. The mobile communication device of claim 1, wherein the GNSS receiver suspends a positioning operation when the mobile communication device switches from an out-of-service mode to an initial cell search mode.

14. The mobile communication device of claim 13, wherein the communication circuit initiates a time counting operation when the mobile communication device enters the out-of-service mode, and the mobile communication device switches to the initial cell search mode when a timeout of the time counting operation occurs.

15. The mobile communication device of claim 14, wherein the GNSS receiver suspends the positioning operation when the timeout of the time counting operation occurs.

16. The mobile communication device of claim 14, wherein a timeout length setting of the time counting operation is time-variant.

17. The mobile communication device of claim 1, wherein when the mobile communication device is in an active mode and the GNSS receiver is performing a positioning operation, the communication circuit does not adjust the control signal if a frequency offset of the oscillator is less than a predetermined threshold value.

18. The mobile communication device of claim 17, wherein the communication circuit determines whether to adjust the control signal or not according to a communication quality thereof, if the frequency offset of the oscillator is not less than the predetermined threshold value.

19. The mobile communication device of claim 18, wherein the communication circuit judges a current communication quality thereof according to a bit error rate (BER) of received signals.

20. The mobile communication device of claim 18, wherein the communication circuit adjusts the control signal to calibrate the frequency value of the clock signal output by the oscillator if the communication circuit judges that the current communication quality thereof does not reach a predetermined level.

21. The mobile communication device of claim 18, wherein the communication circuit estimates a future communication quality thereof and adjusts the predetermined threshold value according to an estimation result if the communication circuit judges that the current communication quality thereof achieves a predetermined level.

22. The mobile communication device of claim 21, wherein the communication circuit estimates the future communication quality thereof according to a current power control command thereof.

23. The mobile communication device of claim 22, wherein the current power control command is an inner loop power control command.

24. The mobile communication device of claim 17, wherein the communication circuit adjusts the predetermined threshold value adaptively.

25. The mobile communication device of claim 1, wherein the communication circuit comprises:
 a mixer, for mixing the clock signal with signals transmitted from a base station to generate a mixed signal;
 an analog-to-digital converter (ADC), for converting the mixed signal to a digital signal;
 a control unit, for deducing a frequency offset of the clock signal according to the digital signal, and generating a digital control value according to the frequency offset; and
 a digital-to-analog converter (DAC), for generating a control voltage according to the digital control value utilized for controlling the oscillator to generate the clock signal;
 wherein the control signal is the digital control value or the control voltage.

26. A global navigation satellite system (GNSS) receiver, comprising:
 an oscillator, shared between the GNSS receiver and a communication circuit, controlled by a control signal of the communication circuit to provide a clock signal having a frequency value corresponding to the control signal to the GNSS receiver and the communication circuit;
 a decision unit, having at least a storage unit configured for recording digital information represented by the control signal, wherein the decision unit records a plurality of digital information represented by a plurality of control signals output by the communication circuit at different times; and
 a baseband circuit, coupled to the decision unit, wherein the baseband circuit obtains the frequency value of the clock signal through the decision unit by reading the digital information;
 wherein the GNSS receiver:
  compensates a positioning operation according to the plurality of control signals recorded in the decision unit;
  obtains an impending frequency variation of the clock signal according to the plurality of control signals recorded in the decision unit; and
  suspends the positioning operation when the impending frequency variation of the clock signal exceeds a predetermined variation value.

27. The GNSS receiver of claim 26, wherein the oscillator is externally connected to the GNSS receiver.

28. The GNSS receiver of claim 26, wherein the digital information is a control voltage of the oscillator.

29. The GNSS receiver of claim 28, wherein the decision unit detects and records a voltage value of the control voltage, and the baseband circuit obtains the frequency value according to the voltage value recorded in the decision unit.

30. A global navigation satellite system (GNSS) receiver, comprising:
 an external oscillator, shared between the GNSS receiver and a communication circuit, controlled by a control signal of the communication circuit to provide a clock signal having a frequency value corresponding to the control signal to the GNSS receiver and the communication circuit; and
 a decision unit, having at least a storage unit configured for recording digital information represented by the control signal;
 wherein the GNSS receiver obtains the frequency value of the clock signal by reading the digital information represented by the control signal recorded in the decision unit, and when the communication circuit is in an active mode and the GNSS receiver is performing a positioning operation, the communication circuit does not adjust the control signal if a frequency offset of the oscillator is less than a predetermined threshold value.

* * * * *